US009913005B2

(12) United States Patent
Tsujita

(10) Patent No.: US 9,913,005 B2
(45) Date of Patent: Mar. 6, 2018

(54) WHEEL ASSEMBLY POSITION IDENTIFYING APPARATUS

(71) Applicant: PACIFIC INDUSTRIAL CO., LTD., Ogaki-shi (JP)

(72) Inventor: Yasuhisa Tsujita, Mostosu (JP)

(73) Assignee: PACIFIC INDUSTRIAL CO., LTD., Ogaki-Shi, Gifu-Ken (JP)

( * ) Notice: Subject to any disclaimer, the term of this patent is extended or adjusted under 35 U.S.C. 154(b) by 0 days.

(21) Appl. No.: 15/025,304

(22) PCT Filed: Jun. 26, 2015

(86) PCT No.: PCT/JP2015/068476
§ 371 (c)(1),
(2) Date: Mar. 28, 2016

(87) PCT Pub. No.: WO2016/208055
PCT Pub. Date: Dec. 29, 2016

(65) Prior Publication Data
US 2017/0155977 A1    Jun. 1, 2017

(51) Int. Cl.
*B60C 23/00* (2006.01)
*H04Q 9/00* (2006.01)
*B60C 23/04* (2006.01)

(52) U.S. Cl.
CPC .......... *H04Q 9/00* (2013.01); *B60C 23/0416* (2013.01); *B60C 23/0483* (2013.01);
(Continued)

(58) Field of Classification Search
CPC . B60C 23/04; B60C 23/0416; B60C 23/0488; B60C 23/0489; B60C 23/0483; B60C 23/0486; H04Q 9/00
(Continued)

(56) References Cited

U.S. PATENT DOCUMENTS 8,498,759 B1 * 7/2013 Juzswik .............. B60C 23/0416
701/10
2006/0250228 A1 11/2006 Mori et al.
(Continued)

FOREIGN PATENT DOCUMENTS

DE 102007028518 A1 12/2008
JP 2006312342 A 11/2006
(Continued)

OTHER PUBLICATIONS

International Search Report, PCT/JP2015/068476, dated Aug. 11, 2015, pp. 1-3.
(Continued)

*Primary Examiner* — Thomas Mullen
(74) *Attorney, Agent, or Firm* — Cantor Colburn LLP

(57) ABSTRACT

A wheel assembly position identifying apparatus includes transmitters, each of which is provided in one of wheel assemblies, and a receiver, which is provided in a body of a vehicle. Each transmitter includes a transmission section, an acceleration sensor, and a transmission-side control section. The receiver includes a reception section, which is configured to receive the signals, and a reception-side control section, which is configured to execute a first identifying process and a second identifying process. In the first identifying process, the positions of the wheel assemblies, in which the corresponding transmitters are provided, are identified based on variations of the rotational positions of the wheel assemblies at the time when the constant position signals are received. In the second identifying process, the positions of the wheel assemblies, in which the corresponding transmitters are provided, are identified based on the received signal strength indications (RSSIs).

4 Claims, 8 Drawing Sheets

(52) U.S. Cl.
CPC ..... B60C 23/0486 (2013.01); *H04Q 2209/40* (2013.01); *H04Q 2209/88* (2013.01)

(58) Field of Classification Search
USPC .............. 340/442, 444, 447; 73/146; 701/70
See application file for complete search history.

(56) References Cited

U.S. PATENT DOCUMENTS

| | | |
|---|---|---|
| 2009/0012740 A1 | 1/2009 | Hain et al. |
| 2009/0145217 A1* | 6/2009 | Saitou ................. B60C 23/0416 73/146.8 |
| 2011/0313623 A1 | 12/2011 | Greer et al. |
| 2012/0059551 A1* | 3/2012 | Juzswik ............. B60C 23/0416 701/49 |
| 2014/0088816 A1 | 3/2014 | Shima et al. |

FOREIGN PATENT DOCUMENTS

| | | |
|---|---|---|
| JP | 2010030449 A | 2/2010 |
| JP | 2010122023 A | 6/2010 |
| JP | 2012240468 A | 12/2012 |
| JP | 2014083884 A | 5/2014 |
| JP | 2014231337 A | 12/2014 |
| KR | 20130068054 A | 6/2013 |
| KR | 20150048406 A | 5/2015 |

OTHER PUBLICATIONS

Korean Office Action, 10-2016-7007144, dated Dec. 28, 2016, pp. 1-4.
European Search Report, PCT/JP2015068476, dated Mar. 7, 2017, pp. 7.

* cited by examiner

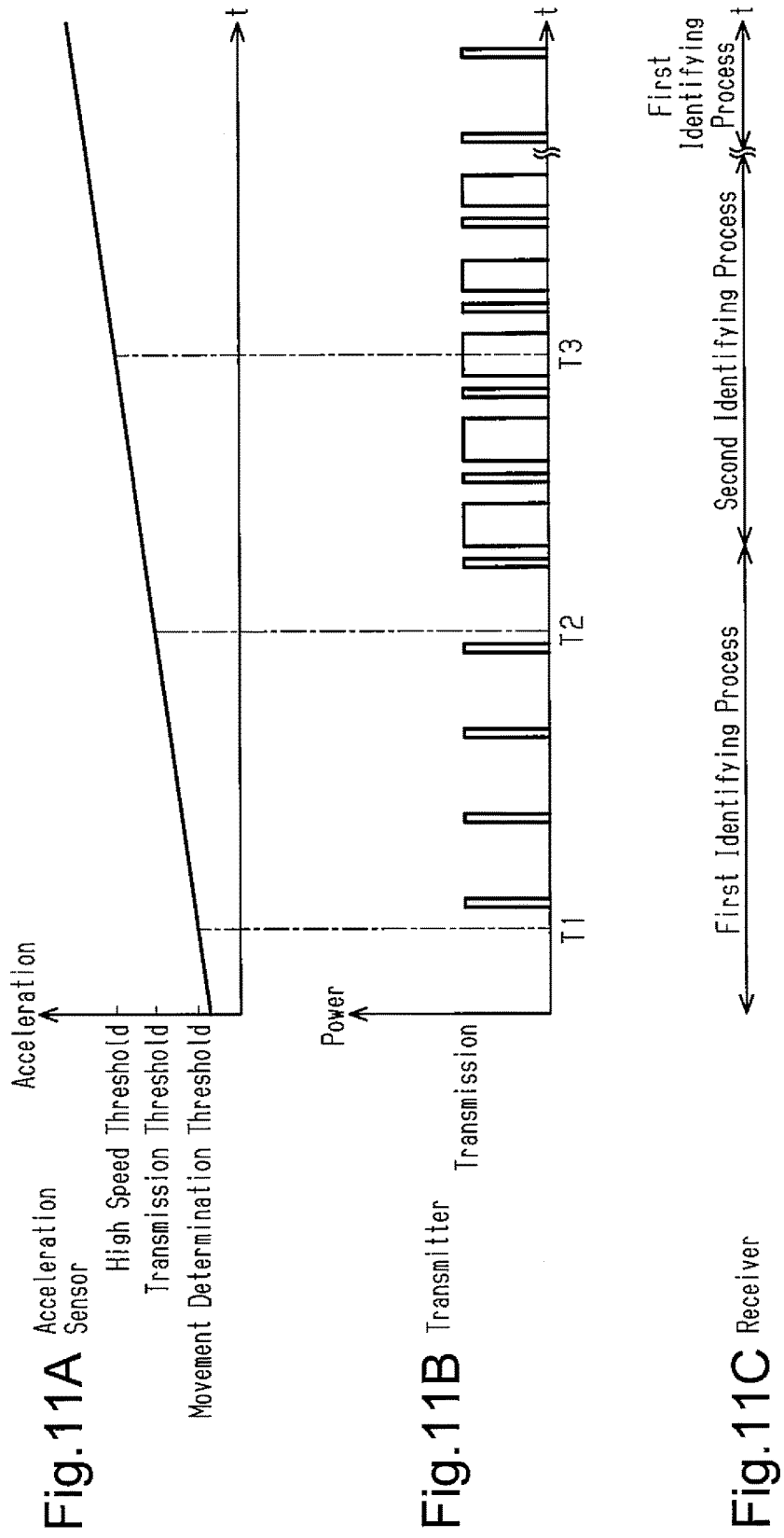

WHEEL ASSEMBLY POSITION IDENTIFYING APPARATUS

TECHNICAL FIELD

The present invention relates to a wheel assembly position identifying apparatus.

BACKGROUND ART

Conventionally, wireless tire condition monitoring apparatuses have been proposed that permit the driver in the passenger compartment to check the conditions of the tires of a vehicle. One such tire condition monitoring apparatus includes a receiver mounted in a vehicle body and transmitters attached to respective wheel assemblies. Each transmitter detects the condition of the associated tire, that is, pressure and temperature in the tire, and wirelessly transmits a signal containing data that represents the detected tire condition. The receiver receives signals transmitted from the transmitters through a reception antenna, and displays information regarding the tire conditions on a display provided in the passenger compartment as necessary.

In such a tire condition monitoring apparatus, the receiver is preferably configured to determine which one of the wheel assemblies a received signal has been transmitted from, in other words, the position of the wheel assembly associated with the received signal.

In the tire condition monitoring apparatus disclosed in Patent Document 1, a transmitter is attached to each of the wheel assemblies of a vehicle. Each transmitter has an acceleration sensor. The transmitter transmits a signal based on the acceleration detected by the acceleration sensor at the time when the rotational position of the wheel assembly is at a constant position (for example, the lowest position). The receiver mounted on the vehicle body detects the rotational positions of the respective wheel assemblies at the time of reception of the signals from the transmitters. The receiver then identifies the positions of the wheel assemblies based on variation in the rotational positions of the wheel assemblies at the times of multiple receptions of the signals.

PRIOR ART DOCUMENT

Patent Document

Patent Document 1: Japanese Laid-Open Patent Publication No. 2010-122023

SUMMARY OF THE INVENTION

Problems that the Invention is to Solve

The acceleration sensor converts the amount of deformation of a detection section (for example, a diaphragm) into a voltage and outputs the voltage. However, when the vehicle speed is increased, so that the rotational speed of the wheel assembly is increased, the centrifugal force acting on the acceleration sensor is increased accordingly. This may cause the deformation amount of the detection section to reach the limit. If the deformation amount of the detection section reaches the limit at a high speed, the transmitter may fail to transmit a signal at the time when the rotational position of the wheel assembly is at the constant position. Also, when the vehicle is moving on a road with great undulations (a rough road), the acceleration detected by the acceleration sensor may contain a large error. The transmitter thus may fail to transmit a signal at the time when the rotational position of the wheel assembly is the constant position. As a result, the receiver may fail to identify the position of the wheel assembly in which the transmitter is provided.

An objective of the present invention is to provide a wheel assembly position identifying apparatus that identifies the positions of wheel assemblies in which transmitters are provided.

Means for Solving the Problems

To achieve the foregoing objective and in accordance with one aspect of the present invention, a wheel assembly position identifying apparatus is provided that is configured to be mounted in a vehicle equipped with rotational position detecting sections, each of which detects a rotational position of one of wheel assemblies. The apparatus includes transmitters, each of which is provided in one of the wheel assemblies and a receiver, which is provided in a body of the vehicle. Each transmitter includes a transmission section, which is configured to transmit signals to the receiver, an acceleration sensor, which is configured to rotate together with the corresponding wheel assembly and detect acceleration acting on the acceleration sensor, and a transmission-side control section, which is configured to cause the transmission section to transmit a constant position signal and a position detecting signal. The constant position signal is transmitted at a constant position based on the acceleration detected by the acceleration sensor, and the position detecting signal is transmitted at a constant power. The receiver includes a reception section, which is configured to receive the signals, and a reception-side control section, which is configured to execute a first identifying process and a second identifying process. In the first identifying process, the positions of the wheel assemblies, in which the corresponding transmitters are provided, are identified based on variations of the rotational positions of the wheel assemblies at the time when the constant position signals are received, and in the second identifying process, the positions of the wheel assemblies, in which the corresponding transmitters are provided, are identified based on the received signal strength indications (RSSIs).

In the first identifying process of the above configuration, it is possible to identify the positions of the wheel assemblies, in which the corresponding transmitters are provided, based on variations of the rotational positions of the wheel assemblies at the time when the constant position signals are received. In the second identifying process, it is possible to identify the positions of the wheel assemblies, in which the corresponding transmitters are provided, based on the received signal strength indications. Therefore, even if the first identifying process cannot be executed due to large errors in the detected accelerations due to the deformation amount of the detection section of each acceleration sensor reaching the limit or the vehicle moving on a road of large undulations, the second identifying process is executed to identify the positions of the wheel assemblies, in which the corresponding transmitters are provided, based on the received signal strength indications.

The above described wheel assembly position identifying apparatus may be configured such that each transmission-side control section causes the constant position signal to be transmitted when the acceleration detected by the acceleration sensor is less than or equal to a transmission threshold, and causes the position detecting signal to be transmitted when the acceleration detected by the acceleration sensor is greater than the transmission threshold. Also, each reception-side control section may execute the first identifying process when the reception section receives the constant position signal but does not receive the position detecting signal, and execute the second identifying process when the reception section receives the position detecting signal.

With this configuration, when the acceleration detected by the acceleration sensor is less than or equal to the transmission threshold, the transmission section transmits the constant position signal but does not transmit the position detecting signal, and the reception-side control section executes the first identifying process. When the acceleration detected by the acceleration sensor is greater than the transmission threshold, the transmission section transmits the position detecting signal, and the reception-side control section executes the second identifying process. That is, the first identifying process and the second identifying process are switched from one to the other at the transmission threshold.

When the positions of the wheel assemblies are identified using the RSSIs, each position detecting signal needs to be continuously transmitted until the wheel assembly rotates a predetermined angle (for example, 360 degrees). Thus, the greater the vehicle speed, the shorter the time during which the position detecting signal is transmitted becomes.

In this regard, the transmission threshold is set. When the transmission time of the position detecting signal is likely to be extended, the first identifying process is executed. In contrast, when the acceleration sensor is predicted to fail to perform the constant position transmission, the second identifying process is executed. Accordingly, the power consumption is prevented from being increased due to extended transmission time of the position detecting signal. Also, failure in identifying the positions of the wheel assemblies due to failed constant position transmission is avoided.

The wheel assembly position identifying apparatus may be configured such that transmission time of each position detecting signal varies in accordance with the acceleration detected by the corresponding acceleration sensor.

With this configuration, when the acceleration detected by each acceleration sensor increases, the transmission time of the position detecting signal is shortened. This reduces the power consumption for transmission of the position detecting signal.

The above described wheel assembly position identifying apparatus may be configured such that each transmission-side control section causes the position detecting signal to be transmitted when time during which the constant position signal cannot be transmitted at the constant position has continued for a predetermined period of time.

With this configuration, the position detecting signal is transmitted when the vehicle speed reaches a value at which the constant position signals cannot be transmitted (when the deformation amounts of the respective detecting sections reach the limit) or when the acceleration sensors cannot perform the constant position transmission due to the vehicle moving on a rough road with great undulations (an undulated road). Thus, compared to a case in which the position detecting signals are always transmitted, the power consumption is reduced.

Effects of the Invention

The present invention allows the positions of wheel assemblies in which transmitters are provided to be identified.

BRIEF DESCRIPTION OF THE DRAWINGS

FIG. 11A is a timing diagram showing the acceleration detected by an acceleration sensor;

FIG. 11B is a timing diagram showing a signal transmitted from a transmitter; and FIG. 11C is a timing diagram showing the manner in which the receiver identifies the positions of the wheel assemblies.

MODES FOR CARRYING OUT THE INVENTION

Figure 1B:
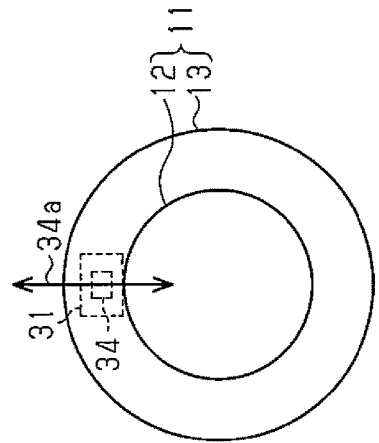
FIG. 1B is a diagram showing the positional relationship between the detection axis of an acceleration sensor and a wheel assembly.

A wheel assembly position identifying apparatus according to one embodiment will now be described.

As shown in FIG. 1, a vehicle 10 is equipped with an anti-lock braking system (ABS) 20 and a tire condition monitoring apparatus 30. The ABS 20 includes an ABS controller 25 and rotation sensor units 21 to 24, each of which corresponds to one of four wheel assemblies 11 of the vehicle 10.

The first rotation sensor unit 21 corresponds to a left front wheel assembly FL, which is located at the front left part of the vehicle 10. The second rotation sensor unit 22 corresponds to a right front wheel assembly FR, which is located at the front right part of the vehicle 10. The third rotation sensor unit 23 corresponds to a left rear wheel assembly RL, which is located at the rear left part of the vehicle 10. The fourth rotation sensor unit 24 corresponds to a right rear wheel assembly RR, which is located at the rear right part of the vehicle 10.

Each wheel assembly 11 includes a vehicle wheel 12 and a tire 13 attached to the vehicle wheel 12. The ABS controller 25 is constituted by circuitry such as a microcomputer, that is, a processor, and is programmed to obtain the rotational positions (rotation angles) of the wheel assemblies 11 based on signals from the rotation sensor units 21 to 24.

The vehicle 10 is equipped with a control device 14, which controls operations of the vehicle 10 such as starting and stopping of the engine in an integrated manner. An ignition switch 15 is connected to the control device 14. The ignition switch 15 allows the engine to be started and stopped by the driver of the vehicle 10.

Figure 2:
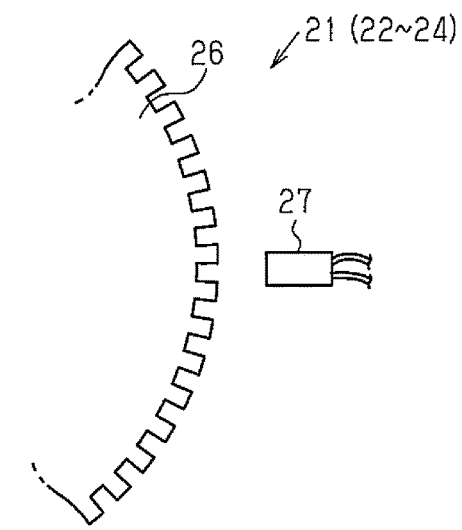
FIG. 2 is a schematic diagram showing a rotation sensor unit of the embodiment.

As shown in FIG. 2, each of the rotation sensor units 21 to 24 includes a gear 26, which rotates integrally with the wheel assembly 11, and a detector 27, which is arranged to face the outer circumferential surface of the gear 26. The rotation sensor units 21 to 24 function as rotational position detecting sections. The gear 26 has multiple teeth (forty-eight teeth in the present embodiment) at equal angular intervals on the outer circumference. The detector 27 detects pulses generated by rotation of the gear 26.

The ABS controller 25 is connected to each detector 27 by a wire and obtains the rotational position of each wheel assembly 11 based on a count value of pulses of the corresponding detector 27 (hereinafter, referred to as pulse count values). Specifically, at each rotation, the gear 26 causes the detector 27 to generate pulses the number of which corresponds to the number of the teeth. The ABS controller 25 counts the pulses generated by the detector 27. The degree of rotation of the gear 26 per pulse count is obtained by dividing 360 degrees by the number of pulses generated by the detector 27 while the wheel assembly 11 rotates one rotation (360 degrees).

Figure 3:
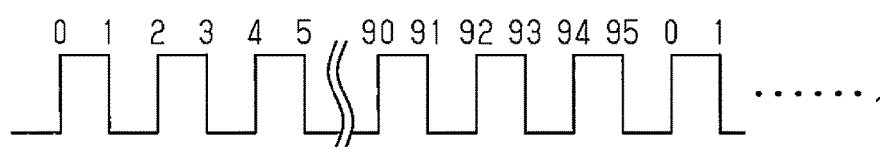
FIG. 3 is a diagram showing pulses generated by a detector of the embodiment and a manner in which the pulses are counted.

As shown in FIG. 3, the ABS controller 25 counts from 0 to 95 by counting rising edges and falling edges of pulses.

Figure 1C:
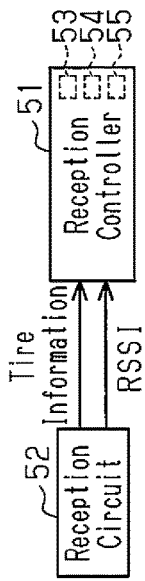
FIG. 1C is a diagram showing the relationship between a reception circuit and a reception controller.
Figure 1A:
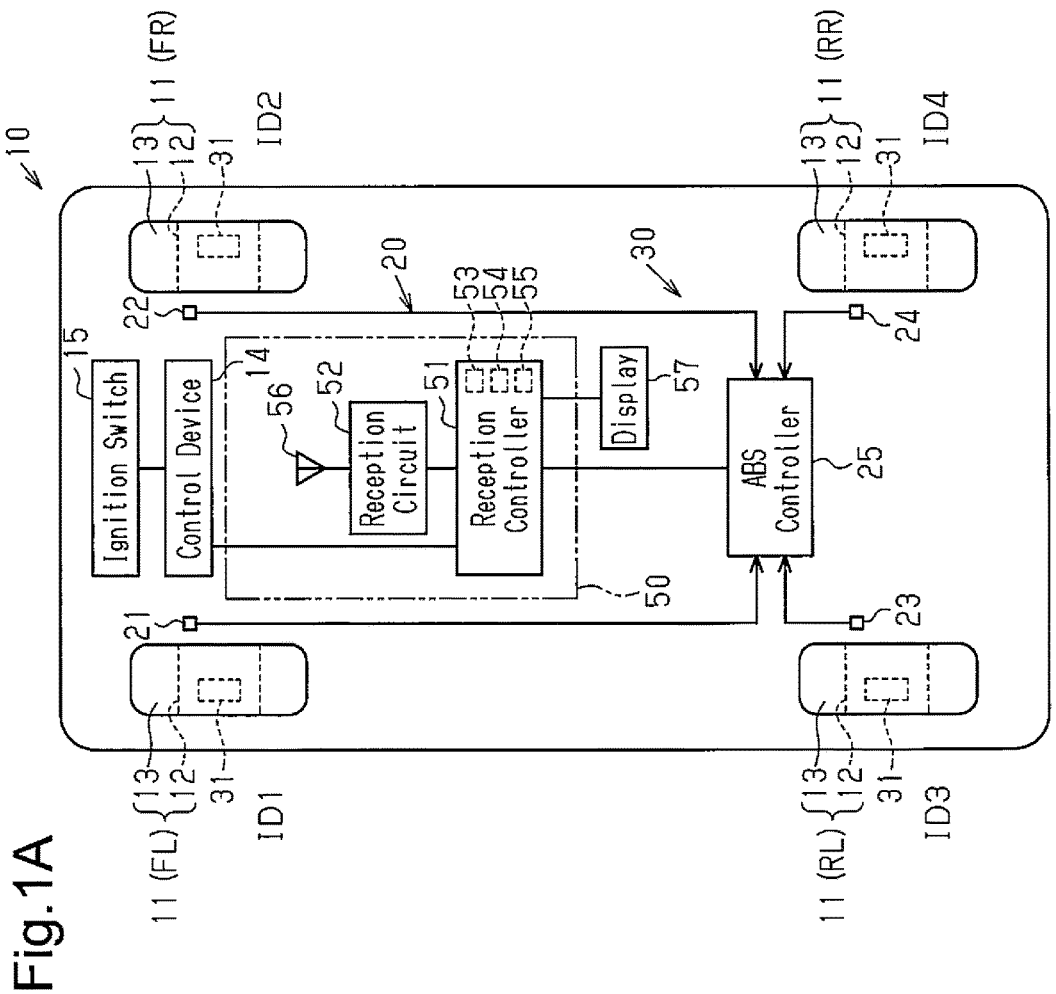
FIG. 1A is a schematic diagram showing a vehicle equipped with a tire condition monitoring apparatus according to one embodiment.

As shown in FIG. 1A, the tire condition monitoring apparatus 30 includes four transmitters 31 and a receiver 50. Each transmitter 31 is located in one of the four wheel assemblies 11. The receiver 50 is located in the body of the vehicle 10. Each transmitter 31 is attached to the vehicle wheel 12, to which a tire 13 is attached, such that the transmitter 31 is arranged inside the tire 13. Each transmitter 31 detects the condition of the associated tire 13 and wirelessly transmits a signal including data that indicates the detected tire condition.

Figure 4:
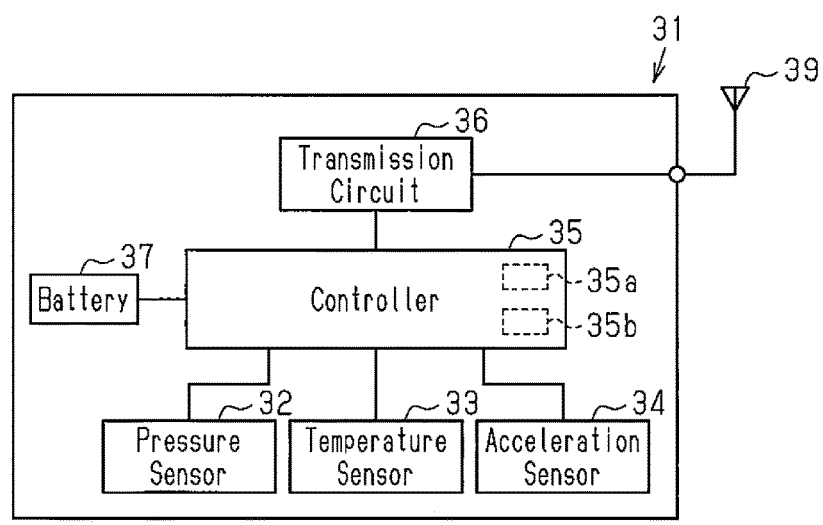
FIG. 4 is a schematic diagram of a transmitter of the embodiment.

As shown in FIG. 4, each transmitter 31 includes a pressure sensor 32, a temperature sensor 33, an acceleration sensor 34, a controller 35, a transmission circuit 36, a battery 37, and a transmission antenna 39. The transmitter 31 is driven by electricity supplied from the battery 37, and the controller 35 controls operations of the transmitter 31 in an integrated manner. The pressure sensor 32 detects the pressure in the corresponding tire 13 (tire air pressure). The temperature sensor 33 detects the temperature in the corresponding tire 13 (tire internal temperature).

As shown in FIG. 1B, the acceleration sensor 34 has a detection axis 34a that is oriented in one direction along the vertical axis (up-down axis) when the transmitter 31 is at the highest position of the wheel assembly 11. When the transmitter 31 is at the lowest position of the wheel assembly 11, the detection axis 34a is oriented in a different direction from that in the case in which the transmitter 31 is at the highest position in the vertical axis. In the present embodiment, the detection axis 34a is oriented vertically upward when the acceleration sensor 34 is at the highest position, and the detection axis 34a is oriented vertically downward when the acceleration sensor 34 is at the lowest position. The acceleration sensor 34 outputs as a voltage the amount of deformation of a detection section (for example, a diaphragm) along the detection axis 34a. The detection axis 34a is used to detect the acceleration in a direction in which centrifugal force acts as the wheel assembly 11 rotates (centrifugal acceleration).

If the acceleration sensor 34 has detection axes other than the detection axis 34a, accelerations acting along the respective detection axes are individually detected. Hereinafter, the acceleration detected by the acceleration sensor 34 refers to the acceleration detected along the detection axis 34a.

As shown in FIG. 4, the controller 35 is configured by circuitry such as a microcomputer, that is, a processor, which includes a CPU 35a, a memory section 35b (such as a RAM and a ROM), an input-output port, and a timer. The controller 35 functions as a transmission-side control section. In the memory section 35b, an ID is registered, which is identification information unique to each transmitter 31. The ID is information used to identify each transmitter 31 at the receiver 50.

The controller 35 obtains, at predetermined obtainment intervals, the tire pressure detected by the pressure sensor 32, the tire internal temperature detected by the temperature sensor 33, and the acceleration detected by the acceleration sensor 34.

The controller 35 determines whether the vehicle 10 is moving based on the acceleration detected by the acceleration sensor 34. When the vehicle 10 moves, the centrifugal force acting on the acceleration sensor 34 increases due to rotation of the wheel assembly 11, and the acceleration detected by the acceleration sensor 34 increases, accordingly. A value that is greater than the acceleration detected when the vehicle 10 is in a stopped state is set as a movement determination threshold, and whether the vehicle 10 is moving is determined by determining whether the acceleration detected by the acceleration sensor 34 is greater than the movement determination threshold is detected.

The controller 35 outputs data containing the tire air pressure data, the tire internal temperature data, and the ID to the transmission circuit 36. The transmission circuit 36 generates signals and wirelessly transmits the signals from the transmission antenna 39. The transmission circuit 36 functions as a transmission section. The controller 35 is programmed to control the transmission circuit 36. In the present embodiment, two types of signals, or a stationary signal and a position detecting signal, are transmitted from the transmission antenna 39. The stationary signal is a signal that has been modulated to transmit data and transmitted at predetermined time intervals. The position detecting signal, which is not designed to transmit data, is continuously transmitted at a constant power during a predetermined transmission time.

The stationary signal is transmitted when the rotational position of the wheel assembly 11 is a predetermined constant position. In the present embodiment, the controller 35 transmits the stationary signal when the transmitter 31 is at the lowest position in the wheel assembly 11. The transmitter 31 being at the lowest position is detected based on the acceleration detected by the acceleration sensor 34. Specifically, the acceleration sensor 34 outputs the deformation amount of the detecting section as a voltage containing a direct-current component and an alternating-current component. The direct-current component indicates the centrifugal acceleration, and the alternating-current component indicates the gravitational acceleration.

The controller 35 transmits the stationary signal when the gravitational acceleration detected by the acceleration sensor 34 becomes +1 G. This allows the controller 35 to transmit the stationary signal when the transmitter 31 is at the lowest position (the constant position) in the wheel assembly 11. Thus, the constant position is a position at which the transmitter 31 is at the lowest position in the wheel assembly 11, and the stationary signal is a constant position signal, which is transmitted at the constant position.

As shown in FIG. 1A, the receiver 50 includes a reception controller 51, a reception circuit 52, which functions as a receiving section, and a reception antenna 56. The reception controller 51 of the receiver 50 is connected to a display 57. Also, the reception controller 51 is connected to the ABS controller 25 and the control device 14.

The reception controller 51 is configured by circuitry such as a microcomputer, that is, a processor, which includes an AD converter 53, a CPU 54, a memory section 55 (such as a ROM and a RAM), and an input-output port. The memory section 55 stores programs for controlling operations of the receiver 50 in an integrated manner. That is, the reception controller 51 programmed to control operations of the receiver 50 in an integrated manner.

As shown in FIG. 1C, the reception circuit 52 demodulates signals delivered from the transmitters 31 via the reception antenna 56 and outputs information regarding the tires 13 to the reception controller 51. The reception circuit 52 also includes a measuring circuit that measures the received signal strength indication (RSSI) of received signals. The reception circuit 52 outputs the RSSIs of signals to the reception controller 51.

The reception controller 51 obtains information regarding each tire 13 delivered from the reception circuit 52 and obtains the tire state that corresponds to the transmitter 31 that is the source of the transmitted signal. Also, the reception controller 51 converts the information regarding the RSSI delivered from the reception circuit 52 into a digital value and obtains the digital value. Further, the reception controller 51 obtains the pulse count values of the rotation sensor units 21 to 24 based on information delivered from the ABS controller 25. The reception controller 51 causes the display 57 to show information regarding the air pressures.

Also, the reception controller 51 determines whether there is an abnormality in any of the tires 13 based on the information regarding the states of the tires 13. For example, the reception controller 51 determines whether the air pressure of each tire 13 is greater than a lower pressure threshold and determines that there is an abnormality in the tire 13 (insufficient air pressure) if the air pressure of the tire 13 is less than or equal to the low pressure threshold. As the low pressure threshold, for example, 80% of the recommended air pressure of the tires 13 is used. If there is an abnormality in any of the tires 13, the reception controller 51 notifies the driver of the abnormality of the tire 13 through the display 57 or an informing device.

Next, a wheel assembly position identifying process will be described, which is executed for determining which one of the four wheel assemblies 11 corresponds to the information of the tire condition contained in the stationary signal from each of the four transmitters 31.

Control executed by the controller 35 of each transmitter 31 will first be described.

Figure 5:
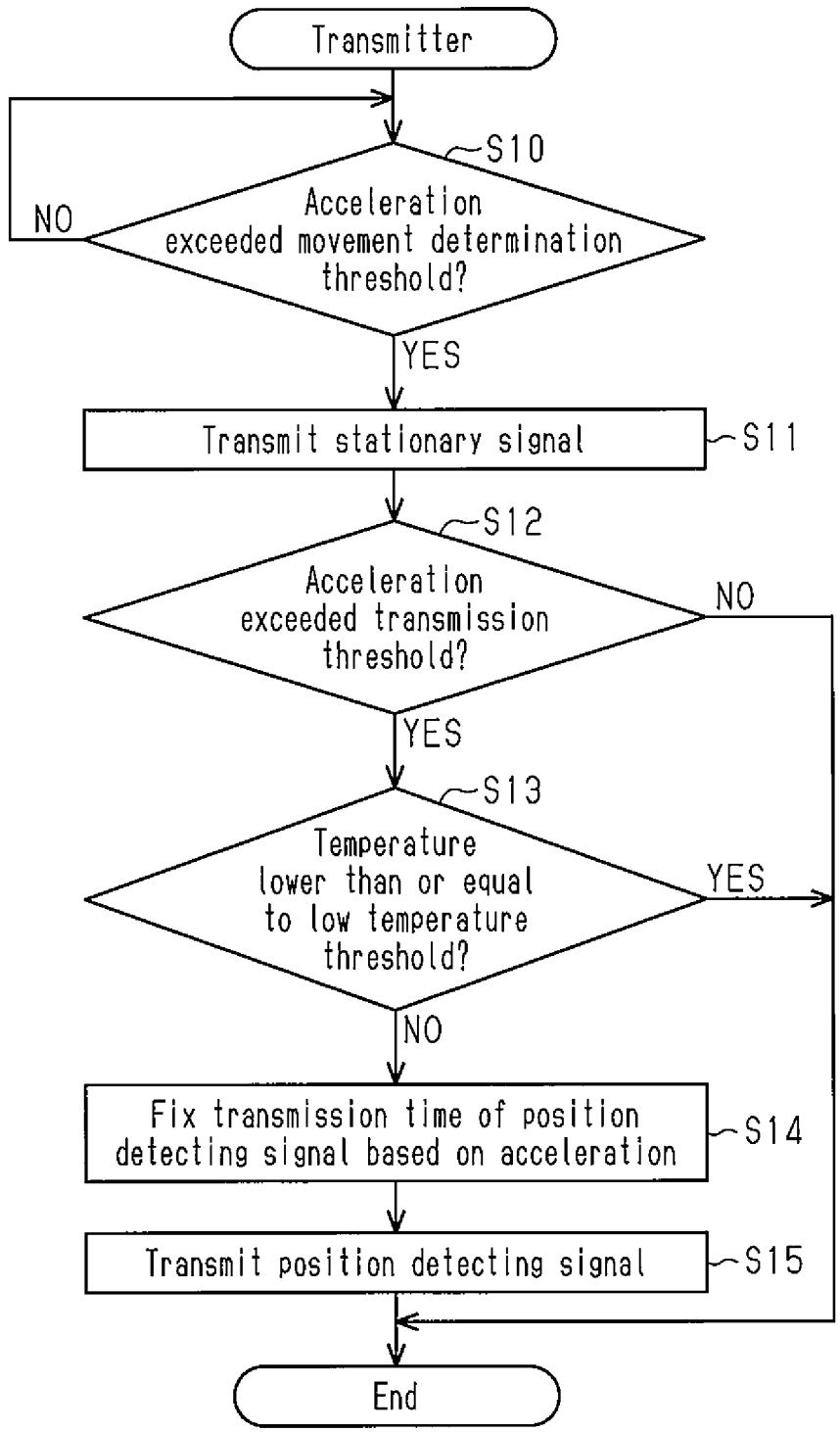
FIG. 5 is a flowchart showing a procedure performed by the controller of each transmitter.

As shown in FIG. 5, at step S10, the controller 35 determines whether the acceleration detected by the acceleration sensor 34 is greater than the movement determination threshold. If the decision outcome of step S10 is negative, the controller 35 repeats step S10. If the decision outcome of step S10 is positive, the controller 35 executes step S11. The controller 35 causes a stationary signal to be transmitted at step S11. The stationary signal contains ID data, air pressure data of the tire 13, status indicating the condition of the vehicle 10, and an error-correction code such as a cyclic redundancy check (CRC).

Next, at step S12, the controller 35 determines whether the acceleration detected by the acceleration sensor 34 is greater than a transmission threshold. The transmission threshold is set, for example, to a value that is slightly lower than a value at which the deformation amount of the detecting section of the acceleration sensor 34 reaches the limit. If the decision outcome of step S12 is negative, the controller 35 terminates the process.

In contrast, if the decision outcome of step S12 is positive, the controller 35 executes step S13. At step S13, the controller 35 determines whether the temperature in the tire 13 detected by the temperature sensor 33 is lower than or equal to a low temperature threshold. The low temperature threshold is set to a temperature that lowers the voltage of the battery 37 to a level at which transmission of the stationary signal is hindered. When the voltage of the battery 37 is lowered to a level at which transmission of signals is hindered, signals cannot be easily transmitted. Thus, if the decision outcome of step S13 is positive, the controller 35 transmits the stationary signal in priority to the position detecting signal and thus terminates the process.

If the decision outcome of step S13 is negative, the controller 35 executes step S14. At step S14, the controller 35 fixes the transmission time of the position detecting signal based on the acceleration detected by the acceleration sensor 34.

In the present embodiment, the transmission time of the position detecting signal is set to be longer than the time in which the wheel assembly 11 rotates one rotation. The time in which the wheel assembly 11 rotates one rotation varies depending on the speed of the vehicle 10. The greater the speed of the vehicle 10, the shorter the time of one rotation of the wheel assembly 11 becomes. As the speed of the vehicle 10 increases, the acceleration detected by the acceleration sensor 34 increases, accordingly. Thus, the controller 35 shortens the transmission time of the position detecting signal as the acceleration detected by the acceleration sensor 34 increases.

In the present embodiment, a high speed threshold, which is greater than the transmission threshold, is used. When the acceleration detected by the acceleration sensor 34 exceeds the high speed threshold, the transmission time of the position detecting signal is shortened compared to a case in which the acceleration is less than or equal to the high speed threshold.

Next, at step S15, the controller 35 causes a position detecting signal to be transmitted. The position detecting signal is transmitted at a constant power for the transmission time fixed at step S14. The position detecting signal at least contains data that indicates an ID.

After the stationary signal is transmitted at step S14, the position detecting signal is transmitted before the stationary signal is transmitted next time. The position detecting signal is transmitted a predetermined number of times from when the vehicle 10 starts driving of the vehicle 10. After being transmitted the predetermined number of times, the position detecting signal is not transmitted even if the acceleration detected by the acceleration sensor 34 exceeds the transmission threshold. The predetermined number of times is set to a number of times at which it is predicted that it will be possible to identify the position of the wheel assembly 11 in which the transmitter 31 that has transmitted the position detecting signal is located.

If the acceleration detected by the acceleration sensor 34 has remained less than or equal to the movement determination threshold for at least a predetermined time, in other words, if the vehicle 10 has been in a stopped state for at least the predetermined time, the controller 35 resets the number of times of transmission of the position detecting signal. Thereafter, if the acceleration detected by the acceleration sensor 34 exceeds the movement determination threshold, transmission of the position detecting signal will be executed the predetermined number of times again.

That is, the controller 35 cancels suspension of transmission of the position detecting signal when the vehicle has been in a stopped state for a predetermined time. The predetermined time is set, for example, to a time between tire rotations, that is, a time between changes of the positions of the wheel assemblies 11. Therefore, the positions of the wheel assemblies 11 are identified after being changed.

Next, control executed by the reception controller 51 of the receiver 50 will be described.

Figure 6:
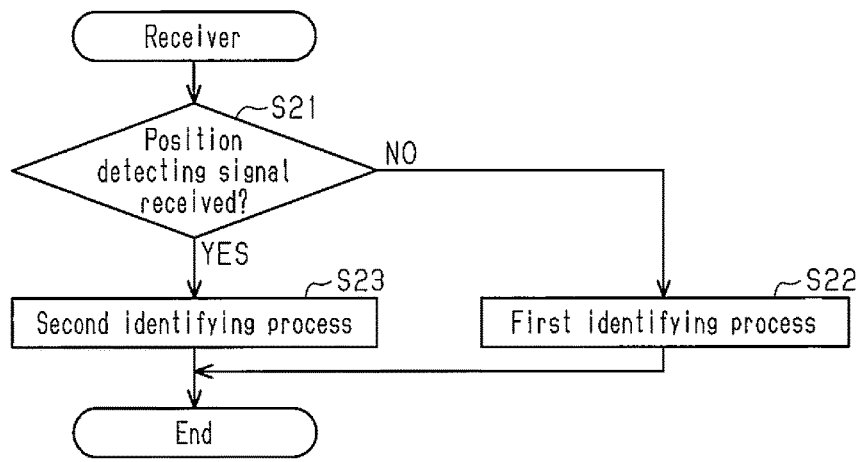
FIG. 6 is a flowchart showing a procedure performed by the reception controller of the receiver.

As shown in FIG. 6, the reception controller 51 determines whether the reception circuit 52 has received the position detecting signal as shown in FIG. 6. If the decision outcome of step S21 is negative, that is, if the reception circuit 52 has received only the stationary signal, the reception controller 51 executes step S22.

If the reception circuit 52 has received only the stationary signal, the acceleration detected by the acceleration sensor 34 is less than or equal to the transmission threshold. At step S22, the reception controller 51 executes a first identifying process. The first identifying process is a process for identifying the positions of the wheel assemblies 11, in each of which a transmitter 31 is provided, based on the pulse count values of the rotation sensor units 21 to 24 at the time of reception of the stationary signals by the reception circuit 52. The first identifying process will now be described.

Figure 7:
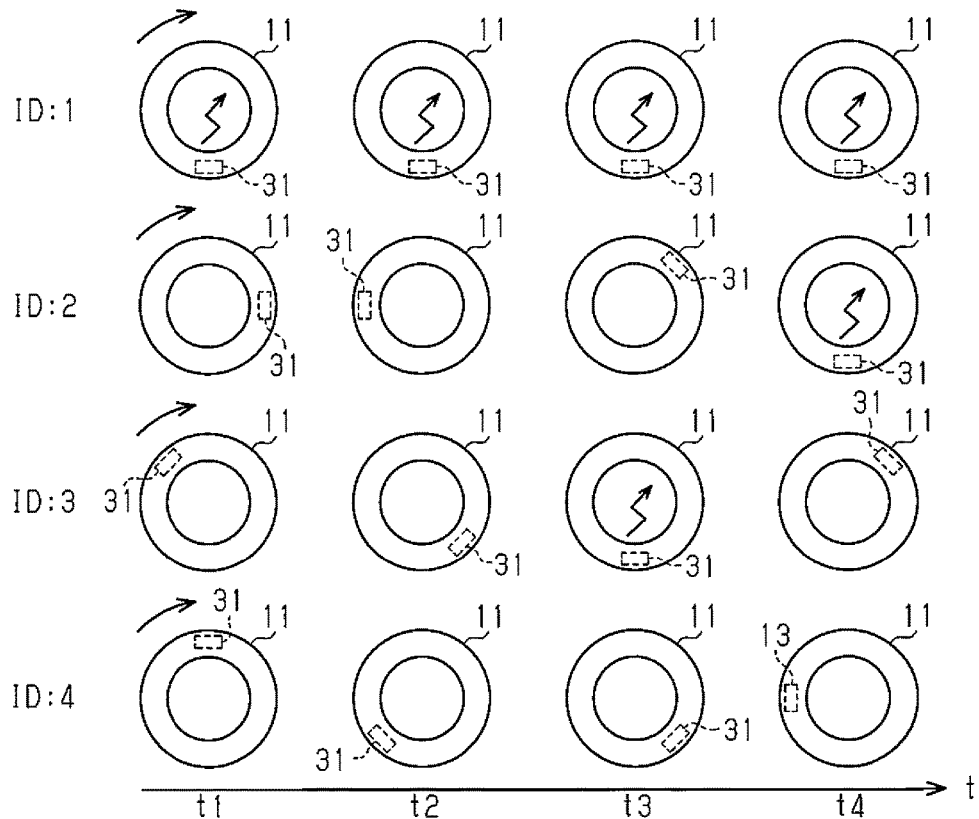
FIG. 7 is a diagram showing the positions of the transmitters in the respective wheel assemblies when the transmitter of an ID1 transmits a constant position signal.

FIG. 7 illustrates a hypothetical case in which a transmitter 31 of an ID1 is provided in the left front wheel assembly FL, a transmitter 31 of an ID2 is provided in the right front wheel assembly FR, a transmitter 31 of an ID3 is provided in the left rear wheel assembly RL, and a transmitter 31 of an ID4 is provided in the right rear wheel assembly RR.

Referring to the wheel assembly 11 in which the transmitter 31 of the ID1 is provided, the transmitter 31 outputs the stationary signal at points in time t1, t2, t3, and t4, that is, at points in time at which the transmitter 31 is at the lowest position in the wheel assembly 11. Since the points in time t1, t2, t3, and t4 are points in time at which the transmitter 31 of the ID1 is at the lowest position in the wheel assembly 11, the rotational positions of the wheel assembly 11 in which the transmitter 31 of the ID1 is provided are the same at the points in time t1, t2, t3, and t4.

Figure 8:
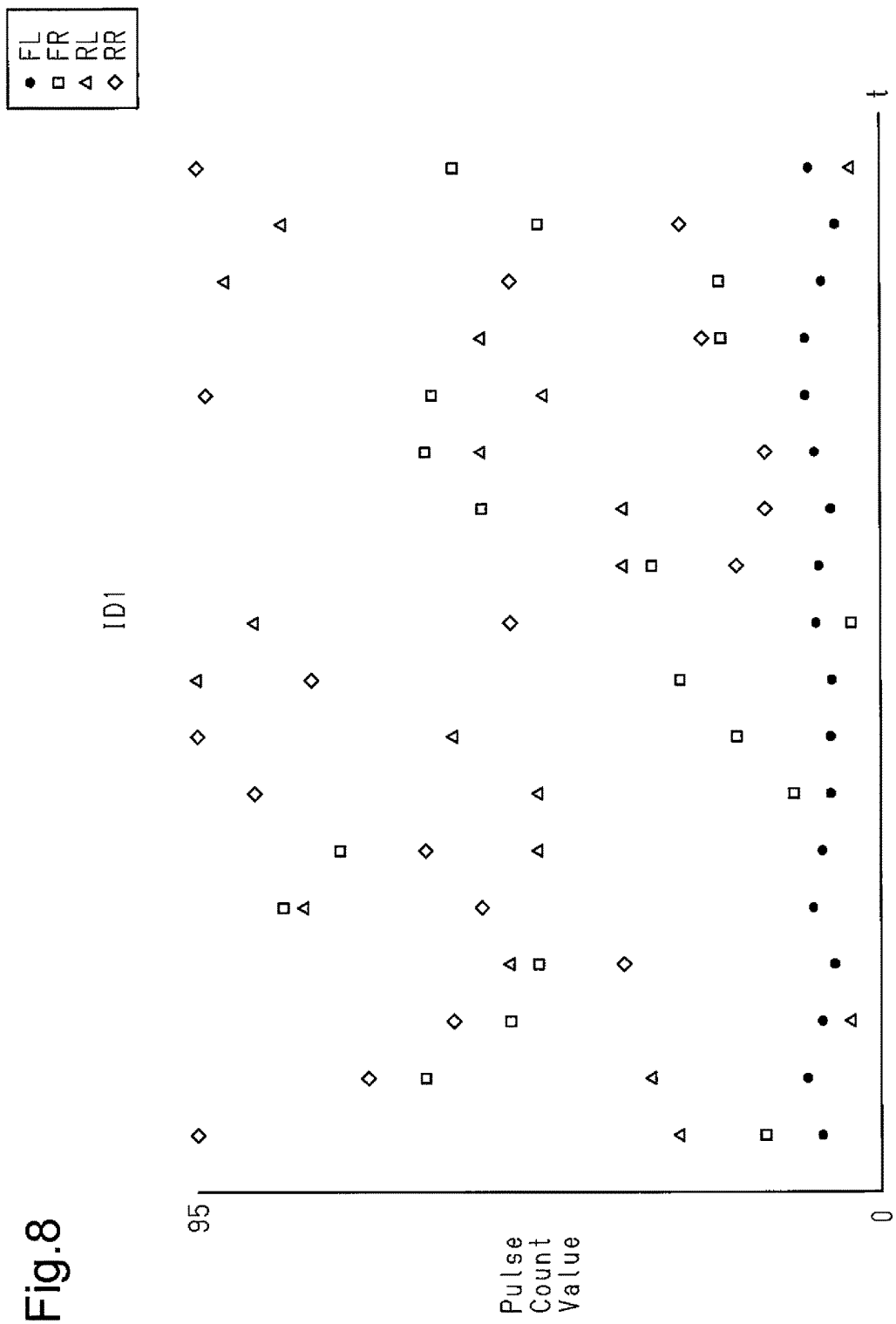
FIG. 8 is a diagram showing the pulse count values of the respective rotation sensor units when the receiver receives the constant position signal transmitted from the transmitter of the ID1.

In contrast, the numbers of rotations of the wheel assemblies 11 vary, for example, due to the influence of the differential gear. Thus, the rotational positions of the wheel assemblies 11 in which the transmitters 31 of the ID2, the ID3, and ID4 are provided vary at the points in time t1, t2, t3, and t4. Therefore, if the pulse count values detected by the rotation sensor units 21 to 24, that is, the rotational positions of the wheel assemblies 11, are detected when the reception circuit 52 receives the stationary signal from the transmitter 31 of the ID1, the first rotation sensor unit 21, which corresponds to the left front wheel assembly FL, has the least variation as shown in FIG. 8.

The reception controller 51 detects the pulse count values detected by the rotation sensor units 21 to 24 when having received signals from the transmitters 31 more than once, and identifies, as the wheel assembly 11 in which the transmitter 31 of the ID1 is provided, the wheel assembly 11 corresponding to one of the rotation sensor units 21 to 24 that has the least variation of the pulse count value. For example, if the pulse count value of the first rotation sensor unit 21 has the least variation when the stationary signal from the transmitter 31 of the ID1 is received more than once, the transmitter 31 of the ID1 is identified as the one provided in the left front wheel assembly FL.

Likewise, the position of the wheel assemblies 11 in which the transmitters 31 of the ID2, the ID3, and ID4 are identified based on the variations in the pulse count values of the rotation sensor units 21 to 24 when the stationary signals from the transmitters 31 of the ID2, ID3, ID4 are received more than once.

As shown in FIG. 6, if the decision outcome of step S21 is positive, that is, if the reception circuit 52 receives a position detecting signal, the reception controller 51 executes step S23. When the reception circuit 52 receives a position detecting signal, the accelerations detected by the acceleration sensors 34 are greater than the transmission threshold. Thus, the receiver 50 switches from one of the first identifying process and the second identifying process to the other at the transmission threshold.

At step S23, the reception controller 51 executes the second identifying process. The second identifying process is a process for identifying the wheel assembly 11 in which the corresponding transmitter 31 is provided based on the RSSI of the position detecting signal. The second identifying process will now be described.

Figure 9:
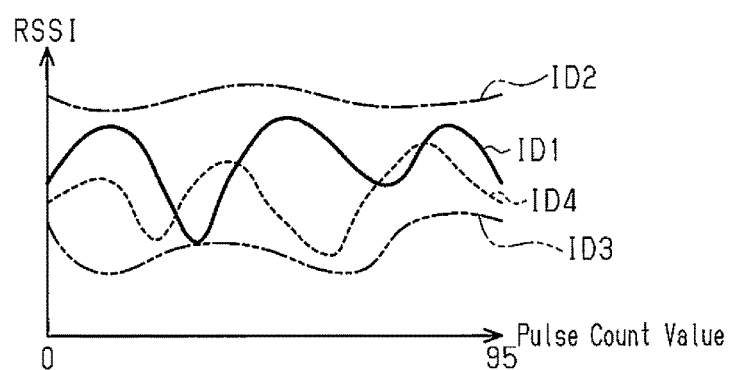
FIG. 9 is a diagram showing the RSSIs of position detecting signals transmitted from the respective transmitters when the rotational speeds of the wheel assemblies are the same.
Figure 10A:
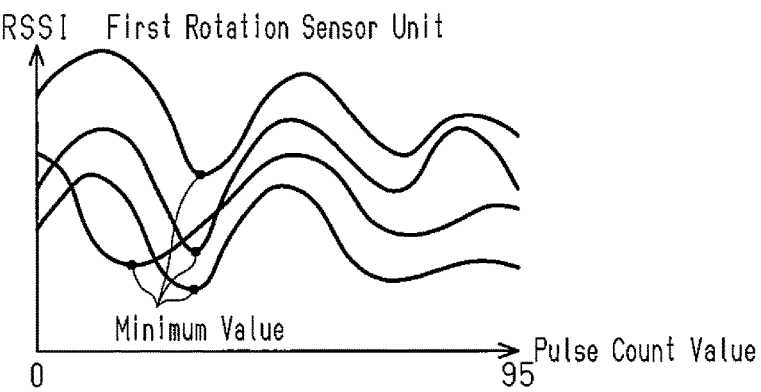
FIG. 10A is a graph showing the relationship between the RSSI and the pulse count value of the first rotation sensor unit when the position detecting signal transmitted from the transmitter of the ID1 is received more than once.
Figure 10B:
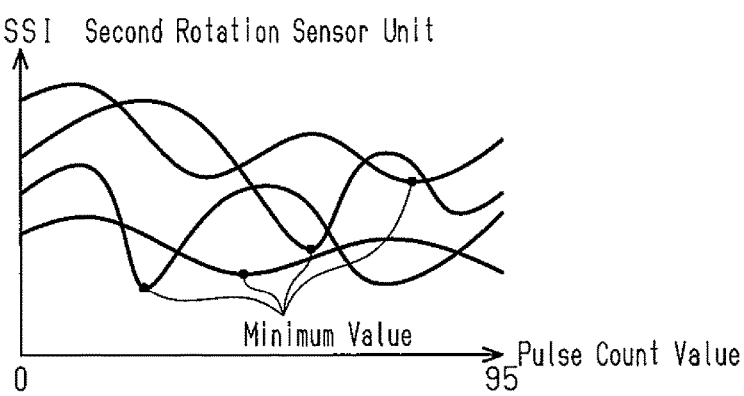
FIG. 10B is a graph showing the relationship between the RSSI and the pulse count value of the second rotation sensor unit when the position detecting signal transmitted from the transmitter of the ID1 is received more than once.
Figure 10C:
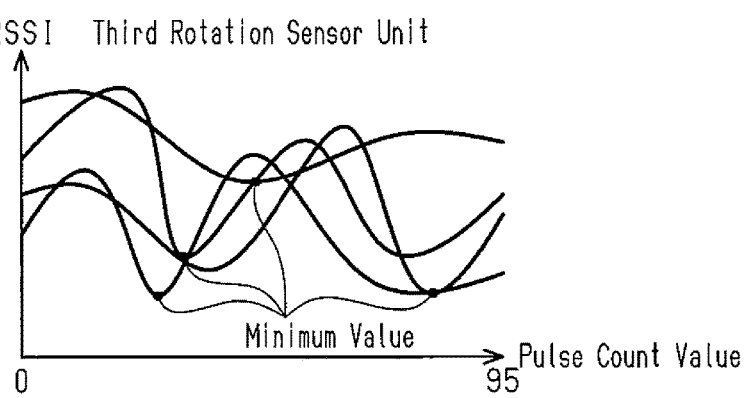
FIG. 10C is a graph showing the relationship between the RSSI and the pulse count value of the third rotation sensor unit when the position detecting signal transmitted from the transmitter of the ID1 is received more than once.
Figure 10D:
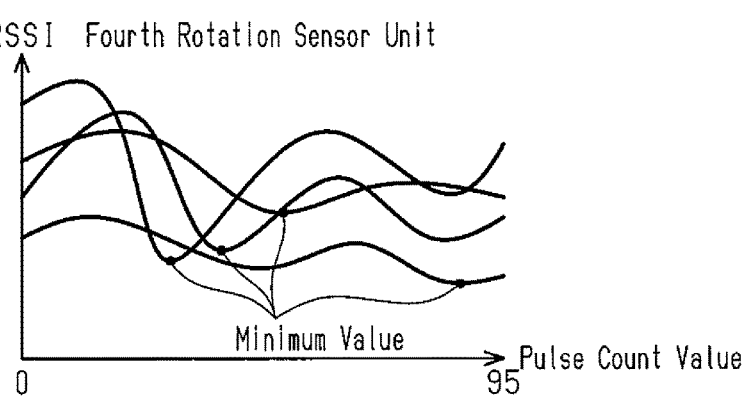
FIG. 10D is a graph showing the relationship between the RSSI and the pulse count value of the fourth rotation sensor unit when the position detecting signal transmitted from the transmitter of the ID1 is received more than once.

As shown in FIG. 9, the RSSIs of the position detecting signals obtained by the reception controller 51 vary in accordance with the rotational positions of the wheel assemblies 11, that is, the pulse count values of the rotation sensor units 21 to 24 detected by the ABS controller 25. The transmitter 31 provided in each wheel assembly 11 transmits position detecting signals while rotating with the wheel assembly 11.

The position detecting signals transmitted from the transmitters 31 are attenuated by obstacles such as occupants and pieces of baggage in the vehicle 10 before being received by the receiver 50. The degrees of attenuation of the position detecting signals due to obstacles vary depending on the positional relationship between each transmitter 31 (each transmission antenna 39) and the receiver 50 (the reception antenna 56). This is because change in the positional relationship between each transmitter 31 and the receiver 50 changes the distance from the transmitter 31 to the receiver 50, the directivity of the transmission antenna 39, and the positional relationship between the transmitter 31 and the obstacles.

When the transmitter 31 transmits the position detecting signal while rotating with the wheel assembly 11, the position detecting signal is transmitted while the positional relationship between the transmitter 31 and the receiver 50 is being changed. Thus, rotational positions (rotation angles) of the wheel assembly 11 are divided into a range in which the position detecting signal is less likely to be attenuated by obstacles and a range in which the position detecting signal is easily attenuated by obstacles.

Therefore, if the position detecting signal is transmitted in one rotation of the wheel assembly 11, part of the signal transmitted in the range of less likelihood of attenuation has a stronger RSSI, and part of the signal transmitted in the range of greater likelihood of attenuation has a weaker RSSI.

Also, in a case in which the RSSIs of the position detecting signals are obtained when all the wheel assemblies 11 rotate one rotation at the same speed, the reception levels (absolute values) of the RSSIs and the pulse count values at extreme values of the RSSIs (the rotational positions of the wheel assemblies 11) are different among the transmitters 31, which have transmitted the position detecting signals. This is because the difference in positions of the transmitters 31 results in difference in the degrees of attenuation due to obstacles.

Although the range of less likelihood of attenuation and the range of greater likelihood of attenuation of the position detecting signal vary depending on the presence/absence and the positions of obstacles, it is assumed that the positions of obstacles in the vehicle 10 remain the same during the period of a single trip (for example, from when the ignition switch is turned to when the ignition switch 15 is turned off). Also, it is predicted that obstacles such as occupants or pieces of baggage will not move frequently during driving of the vehicle 10. Therefore, if errors are not factored in, the rotational position (rotation angle) of each wheel assembly 11 corresponding to an extreme value of the RSSI is predicted to remain the same each time.

As described above, the numbers of rotations (rotation speeds) of the wheel assemblies 11 during driving of the vehicle 10 vary. Therefore, when the rotational positions of the wheel assemblies 11 at which the RSSI of the position detecting signal transmitted from a transmitter 31 of the same ID has an extreme value are detected more than once, the rotational position at which the RSSI has an extreme value remains the same at every detection only in the wheel assembly 11 in which the transmitter that has transmitted the position detecting signal. In reality, due to measuring errors and tolerances of the wheel assembly position identifying apparatus, the rotational position of each wheel assembly 11 corresponding to an extreme value of the RSSI slightly varies each time the rotational position is detected.

Thus, the reception controller 51 groups the position detecting signals transmitted from the four transmitters 31 more than once according to the ID and identifies that the transmitter 31 of the corresponding ID is located in the wheel assembly 11 of the smallest variation in the rotational position of the wheel assembly 11 at which the RSSI has an extreme value. Therefore, the reception controller 51 functions as a reception-side control section. If the RSSI of the position detecting signal transmitted from each transmitter 31 has two or more extreme values, the position of the corresponding wheel assembly 11 may be identified either from one of the extreme values or from all the extreme values.

FIG. 1A illustrates a hypothetical case in which a transmitter 31 of an ID1 is provided in the left front wheel assembly FL, a transmitter 31 of an ID2 is provided in the right front wheel assembly FR, a transmitter 31 of an ID3 is provided in the left rear wheel assembly RL, and a transmitter 31 of an ID4 is provided in the right rear wheel assembly RR. In this hypothetical case, the reception controller 51 identifies the position of the corresponding wheel assembly 11 from the minimum value, which is one of extreme values of the RSSI.

FIGS. 10A to 10D illustrate, focusing on the position detecting signal transmitted from the transmitter 31 of the ID1 (hereinafter, referred to as the position detecting signal of the ID1), the RSSI of the position detecting signal of the ID1 at rotational positions (the pulse count values) per rotation of the wheel assemblies 11 in four occasions.

The reception controller 51 refers to the rotational positions of the wheel assemblies 11, or the pulse count values detected by the rotation sensor units 21 to 24, at the time when the RSSI of the position detecting signal of the ID1 has the minimum value. The reception controller 51 identifies the rotation sensor unit that has the smallest variation of pulse count values at the time when the RSSI of the position detecting signal of the ID1. For example, the reception controller 51 obtains, from the rotation sensor units 21 to 24, the RSSI of the position detecting signal of the ID1 more than once and counts the number of times when the minimum value of the RSSI falls within a predetermined range for each of the rotational sensor units 21 to 24.

The predetermined range is a set by factoring in tolerances of the components and measuring errors such that the extreme values of the RSSI can be assumed to be at the same position. The reception controller 51 determines that one of the rotation sensor units 21 to 24 of which the number of times (the ratio) that the minimum value of the RSSI falls within the predetermined range is the largest is the one that corresponds to the wheel assembly 11 having the smallest variation in the pulse count value at which the RSSI has the minimum value.

In the present embodiment, the reception controller 51 determines that the pulse count value detected by the first rotation sensor unit 21 has the smallest variation. Since the first rotation sensor unit 21 corresponds to the left front wheel assembly FL, the transmitter 31 of the ID1 is determined to be provided in the left front wheel assembly FL. For each of the transmitter 31 of the ID2, the transmitter 31 of the ID3, and the transmitter 31 of the ID4, the position of the wheel assembly 11 can be identified.

When the position detecting signal is received more than once as shown in FIGS. 10A to 10D, the reception levels (absolute values) of the RSSIs vary. This is because the surrounding environment causes difference in the degrees of attenuation of the position detecting signal. The absolute value of the RSSI is likely to change due to influence of the surrounding environment. However, even if the absolute value of the RSSI varies, the rotational position of the wheel assembly 11 corresponding to an extreme value of the RSSI is not easily changed.

When an RSSI is detected more than once, an extreme value of the RSSI does not remain at the same position in some cases, even though obstacles in the vehicle 10 have not moved. This is because the position the extreme value of the RSSI can vary depending on the surrounding environment.

That is, in a case in which objects that affect the RSSI, such as other vehicles, are present around the vehicle 10, the position of the extreme value of the RSSI varies. In such a case, however, the vehicle 10 is likely to be temporarily in a stopped state, for example, at a traffic light, and the position detecting signals are not transmitted while the vehicle 10 is in a stopped state.

Also, if another vehicle approaches the vehicle 10 while moving, that state is considered to rarely last for a long time. Thus, when the position detecting signal is detected more than once, extreme values of the RSSI will converge to a constant position in the wheel assembly 11 (a certain rotational position). In the present embodiment, the transmitters 31, which transmit the stationary signals and the position detecting signals, and the receiver 50, which receives the signals from the transmitters 31 and identifies the positions of the wheel assemblies 11, in each of which a transmitter 31 is provided, function as the wheel assembly position identifying apparatus.

Operation of the wheel assembly position identifying apparatus will now be described.

When the vehicle 10 accelerates and the numbers of rotations (rotation speed) of the wheel assemblies 11 increase as shown in FIG. 11A, the acceleration detected by the acceleration sensors 34 increases, accordingly.

When the acceleration detected by the acceleration sensors 34 exceeds the movement determination threshold at point in time T1 as shown in FIGS. 11A and 11B, the transmitters 31 transmit the stationary signals at the constant positions.

When the acceleration detected by the acceleration sensors 34 exceeds the transmission threshold at point in time T2 as shown in FIGS. 11A and 11B, the transmitters 31 transmit the position detecting signals subsequent to the stationary signals.

As shown in FIG. 11C, if the acceleration detected by the acceleration sensors 34 is less than or equal to the transmission threshold while receiving only the stationary signal, the controller 51 executes the first identifying process. When receiving the position detecting signal in addition to the stationary signal, the reception controller 51 executes the second identifying process.

As shown in FIGS. 11A and 11B, when the acceleration detected by the acceleration sensors 34 exceeds the high speed threshold at point in time T3, the transmission time of the position detecting signal is shortened compared to that in a case in which the acceleration detected by the acceleration sensors 34 is greater than the transmission threshold and less than the high speed threshold.

When having transmitted the position detecting signal a predetermined number of times since the starting of driving (from when the ignition switch 15 was turned on), the transmitters 31 stop transmitting the position detecting signal.

The above described embodiment has the following advantages.

(1) The reception controller 51 executes the first identifying process and the second identifying process. In the second identifying process, the positions of the wheel assemblies 11, in each of which a transmitter 31 is provided, are identified based on the RSSIs. Regardless of the position at which the position detecting signal is transmitted, the positions of the wheel assemblies 11, in each of which a transmitter 31 is provided, are identified.

When the deformation amount of the detecting section of each acceleration sensor 34 reaches the limit as the speed of the vehicle 10 is increased, signals can no longer be transmitted at the constant position, and the first identifying process may fail to be executed. Even in such a case, the positions of the wheel assemblies 11, in each of which a transmitter 31 is provided, are identified in the second identifying process. Likewise, when the vehicle 10 moves on a road with great undulations, the gravitational acceleration being +1 G cannot be detected, and the first identifying process cannot be executed. Even in such a case, the positions of the wheel assemblies 11, in each of which a transmitter 31 is provided, are identified in the second identifying process.

(2) The position detecting signals are transmitted when the acceleration detected by the acceleration sensors 34 is greater than the transmission threshold. When identifying the positions of the wheel assemblies 11, in each of which a transmitter 31 is provided, based on the RSSIs, the position detecting signals need to be continuously transmitted until the wheel assemblies 11 rotate a predetermined angle (for example, 360 degrees). Since the rotational speed of the wheel assemblies 11 increases in accordance with the speed of the vehicle 10, the time during which the position detecting signals are transmitted can be shortened if the position detecting signals are transmitted when the speed of the vehicle 10 is great.

In a range of the vehicle speed in which the deformation amount of the detecting section of the acceleration sensor 34 is less than the limit, the first identifying process is executed. Thus, compared to a case in which the position detecting signals are constantly transmitted, the number of times of transmission of position detecting signals is reduced. This reduces the consumption of the power of the battery 37 caused by transmission of the position detecting signals.

(3) When the acceleration detected by the acceleration sensors 34 increases, the transmission time of the position detecting signal is shortened. Therefore, consumption of the power of the battery 37 is reduced compared to a case in which the position detecting signal is always transmitted for the same transmission time regardless of the magnitude of the acceleration detected by the acceleration sensors 34.

(4) The RSSI of the position detecting signal fluctuates and has extreme values as the wheel assemblies 11 rotate. The extreme values of the RSSI are expected not to fluctuate or to fluctuate at limited frequency within a single trip. Thus, the reception controller 51 identifies the positions of the wheel assemblies 11, in each of which a transmitter 31 is provided, based on variations in the rotational positions of the wheel assemblies 11 at which the RSSI reaches the extreme value. Therefore, even if the magnitude relationship between the absolute values of the RSSI change due to the surrounding environment, the positions of the wheel assemblies 11 are identified as long as the extreme values of the RSSI remain the same.

(5) After the ignition switch 15 is turned on, the position detecting signal is transmitted from the transmitters 31 a predetermined number of times. Thus, the number of times the position detecting signal is transmitted is reduced compared to a case in which the position detecting signal continues to be transmitted even after the positions of the wheel assemblies 11, in each of which a transmitter 31 is provided, are identified. This reduces the consumption of the power of the battery 37 caused by transmission of the position detecting signal.

(6) When the temperature in the tires 13 is lower than or equal to the low temperature threshold, the position detecting signal is not transmitted even if the acceleration detected by the acceleration sensors 34 exceeds the transmission threshold. The voltage of the battery 37 drops significantly when the temperature is excessively low. The tire condition monitoring apparatus 30 is preferably capable of identifying that the transmitter 31 of which ID is located in which of the wheel assemblies 11. However, if it is possible to provide notice of an abnormality in any of the wheel assemblies 11, the driver can be informed of the abnormality even if the positions of the wheel assemblies 11, in each of which a transmitter 31 is provided, have not been identified. When the voltage of the battery 37 is significantly low and transmission of signals is difficult, only the stationary signal is transmitted without transmitting the position detecting signal. Accordingly, the voltage will not be lowered to the level insufficient to transmit the position detecting signal, so that a notice of an abnormality of the wheel assembly 11 will be properly provided.

The embodiment may be modified as follows.

In the above illustrated embodiment, the controller 35 starts transmitting the position detecting signal when the acceleration detected by the acceleration sensor 34 exceeds the transmission threshold. However, the present invention is not limited to such a structure. For example, the position detecting signal may be transmitted when time (number of times) in which the signal cannot be transmitted at the constant position has continued for a predetermined period of time. When the deformation amount of the detecting section of the acceleration sensor 34 reaches the limit as the speed of the vehicle 10 is increased, the gravitational acceleration cannot be easily detected, and thus the gravitational acceleration being +1 G cannot be easily detected.

When the vehicle 10 is moving on a rough road with great undulations (an undulated road), noise contained in the acceleration detected by the acceleration sensor 34 is increased, which hampers the detection of +1 G. When unable to detect +1 G (when unable to detected the constant position), the controller 35 incorporates data of a constant position non-detection flag into the stationary signal to be transmitted to the receiver 50. When receiving the stationary signal containing the data of the constant position non-detection flag, the receiver 50 recognizes that the transmitter 31 will transmit the position detecting signal and executes the second identifying process.

In this case, when the speed of the vehicle 10 is increased and the constant position signal can no longer be transmitted, the position detecting signal is transmitted. Thus, compared to a case in which the position detecting signal is always transmitted, the consumption of the power of the battery 37 is reduced.

In the above illustrated embodiment, the positions of the wheel assemblies 11, in each of which a transmitter 31 is provided, are identified based on the variation in the rotational positions of the wheel assemblies 11 at which the RSSIs have extreme values. However, the positions of the wheel assemblies 11 may be identified based on the magnitude relationship of the RSSIs.

For example, the receiver 50 (the reception antenna 56) is arranged at different distances from the respective transmitters 31 and measures the RSSIs of the position detecting signals transmitted from the respective transmitters 31. The position detecting signals transmitted from the transmitters 31 are more attenuated as the distance from the receiver 50 increases. Thus, the transmitter 31 that has transmitted the position detecting signal of the greatest RSSI is identified as the one mounted in the wheel assembly 11 located closest to the receiver 50. Accordingly, it is identified that the order of the distances of the respective wheel assemblies 11 from the receiver 50 corresponds to the order of the magnitudes of the RSSIs of the detected position detecting signals.

The position at which the constant position signal is transmitted is not limited to the lowest position in the wheel assembly 11. For example, if the constant position signal is transmitted when the acceleration sensor 34 detects −1 G, the constant position sensor is transmitted at the highest position in the wheel assembly 11.

The first identifying process and the second identifying process may be executed concurrently. For example, the stationary signal is transmitted at the constant position, and the transmission time of the stationary signal is extended to a value sufficient for the position of the wheel assembly 11 can be identified in the second identifying process. The reception controller 51 executes the first identifying process based on the pulse count values of the rotation sensor units 21 to 24 at the time of reception of the stationary signals and then executes the second identifying process based on the RSSIs of the stationary signals. In this case, each stationary signal functions as the constant position signal and the position detecting signal. That is, the constant position signal and the position detecting signal do not need to be individual signals, but may constitute a single signal.

The position detecting signal does not need to contain the data indicating an ID. For example, immediately before transmitting the position detecting signal, the controller 35 may transmit to the receiver 50 a recognition signal for causing the receiver 50 to recognize that controller 35 will transmit the position detecting signal. The recognition signal contains data indicating an ID. When receiving the position detecting signal, the receiver 50 determines that the position detecting signal has been transmitted from the transmitter 31 of the same ID as that of the recognition signal that has been received immediately before receiving the position detecting signal.

The positions of the wheel assemblies 11 may be identified based on variation of the pulse count values when the RSSI reaches the maximum value, which is one of the extreme values. Likewise, the positions of the wheel assemblies 11 may be identified from variation of the pulse count value when the RSSI reaches one of the extreme values that is different from the minimum value or the maximum value.

When the RSSI has two or more extreme values, the positions of the wheel assemblies 11, in each of which a transmitter 31 is provided, may be identified based on variation in the rotational positions of the wheel assemblies 11 when the RSSI reaches each of the extreme values.

For example, one of the extreme values is defined as a first extreme value, and another extreme value is defined as a second extreme value. If the positions of the wheel assemblies 11, in each of which a transmitter 31 is provided, cannot be identified based on variation in the rotational positions of the wheel assemblies 11 when the RSSI reaches the first extreme value, the positions of the wheel assemblies 11 may be identified based on variation in the rotational positions of the wheel assemblies 11 when the RSSI reaches the second extreme value.

The positions of the wheel assemblies 11, in each of which a transmitter 31 is provided, may be identified based on variation in the rotational positions of the wheel assemblies 11 when the RSSI reaches the first extreme value and such variation when the RSSI reaches the second extreme value. In this case, the reception controller 51 determines the wheel assembly 11 of the smallest variation in the rotational position when the RSSI reaches the first extreme value and the second extreme value, and determines that the wheel assembly 11 in which the number of times (the ratio of) the variation is determined to be small is great (high) accommodates the transmitter 31 that has transmitted the position detecting signal.

The position detecting signal may be continuously transmitted from each transmitter 31 for a time shorter than the time required for the wheel assembly 11 to rotate one rotation.

For example, the time in which the position detecting signal is transmitted may be a time in which the wheel assembly 11 rotates 300 degrees (5/6 rotations) or 270 degrees (3/4 rotations). That is, the transmission time of the position detecting signal may be any value as long as at least one extreme value is detected in that time.

If the time in which the position detecting signal is transmitted is shorter than the time for the wheel assemblies 11 to rotate one rotation, the rotational position of the wheel assembly 11 at which the position detecting signal is transmitted preferably remains constant at each transmission.

For example, the constant rotational position of the wheel assembly 11 may be the one when the transmitter 31 (the acceleration sensor 34) is at the lowest position in the wheel assembly 11, and the transmission circuit 36 may transmit the position detecting signal each time the transmitter 31 reaches the lowest position in the wheel assembly 11. The transmitter 31 reaching the lowest position in the wheel assemblies 11 can be detected when the acceleration sensor 34 detects that the gravitational acceleration becomes 1 G (±1 G) or when the rotational position of the wheel assembly 11 is detected.

Two or more high speed thresholds may be used. For example, a first high speed threshold and a second high speed threshold, which is greater than the first high speed threshold, may be set. In this case, when the acceleration detected by the acceleration sensor 34 exceeds the first high speed threshold, the transmission time of the position detecting signal is shortened compared to that in a case in which the acceleration detected by the acceleration sensor 34 is less than or equal to the first high speed threshold. When the acceleration detected by the acceleration sensor 34 exceeds the second high speed threshold, the transmission time of the position detecting signal is shortened further.

In the above illustrated embodiment, when the temperature in the tire 13 detected by the temperature sensor 33 is lower than or equal to the low temperature threshold, the position detecting signal is not transmitted. Instead, in such a case, the frequency of transmission of the position detecting signal may be reduced.

The position detecting signal may be transmitted regardless of the temperature in the tire 13 detected by the temperature sensor 33. In this case, the temperature sensor 33 may be omitted.

In the above illustrated embodiment, when the temperature in the tire 13 detected by the temperature sensor 33 is lower than or equal to the low temperature threshold, the position detecting signal is not transmitted. Instead, the voltage of the battery 37 may be detected, and when the voltage is lower than or equal to a voltage threshold, the transmission of the position detecting signal may be restricted. The voltage threshold value may be set, for example, to a value that is slightly higher than a value at which the stationary signal cannot be transmitted. Whether the position detecting signal should be transmitted may be determined based on both of the temperature in the tire 13 detected by the temperature sensor 33 and the voltage of the battery 37.

In the above illustrated embodiment, a capacitor may be provided that is connected in parallel to the transmission circuit 36. In that case, the capacitor stores electrical charge generated by charge of electricity from the battery 37. The electrical charge stored in the capacitor can be used to transmit the stationary signal. As in the above illustrated embodiment, a temperature in the tire 13 lower than the low temperature threshold can lower the voltage of the battery 37 to a level at which the stationary signal cannot be transmitted. In such a case, the capacitor stores electrical charge when the stationary signal is not being transmitted, and the stationary signal can be transmitted with the stored electrical charge.

The vehicle 10 does not need to be a four-wheel vehicle, but may any type as long as it has two or more wheel assemblies 11.

In the illustrated embodiment, the rising edges and the falling edges of pulses are both counted. However, only the rising edges or the falling edges may be counted. In that case, the pulse count value would be half the number of the pulse count value in a case in which both the rising edges and the falling edges are counted.

The number of teeth of the gear may be changed. That is, the number of pulses that are generated by each of the rotation sensor units 21, 24 while the wheel assembly 11 is rotated one rotation.

The transmission threshold may be equal to the movement determination threshold. That is, the transmission of the stationary signal and the transmission of position detecting signal may be started simultaneously.

The display 57 does not need to be provided in the vehicle 10, but may be replaced by a display such as a portable device carried by the driver.

The stationary signal may contain data indicating the temperature in the tire 13.

As long as the positions of the wheel assemblies 11 can be identified, the number of times the rotational positions of the wheel assemblies at which the RSSI of the position detecting signal has the extreme values is obtained may be any number.

Canceling the transmission of the position detecting signal may be performed by sending from a trigger device to the transmitter 31 a signal instructing to cancel suspension of the transmission.

DESCRIPTION OF THE REFERENCE NUMERALS

10 . . . Vehicle, 11 . . . Wheel Assemblies, 12 . . . Vehicle Wheels, 13 . . . Tire, 21 to 24 . . . Rotation Sensor Units, 30 . . . Tire Condition Monitoring Apparatus, 31 . . . Transmitter, 34 . . . Acceleration Sensor, 35 . . . Controller, 36 . . . Transmission Circuit, 50 . . . Receiver, 51 . . . Reception Controller, 52 . . . Reception Circuit

The invention claimed is:

1. A wheel assembly position identifying apparatus configured to be mounted in a vehicle equipped with wheel assemblies and rotational position detecting sections, wherein each of the rotational position detecting sections detects a rotational position of a corresponding one of the wheel assemblies, the apparatus comprising:
   transmitters, each of which is provided in a corresponding one of the wheel assemblies; and
   a receiver, which is provided in a body of the vehicle, wherein
   each transmitter includes
      a transmission section, which is configured to transmit signals to the receiver,
      an acceleration sensor, which is configured to rotate together with the corresponding wheel assembly and detect acceleration acting on the acceleration sensor, and
      a transmission-side control section, which is configured to cause the transmission section to transmit a constant position signal and a position detecting signal, wherein the constant position signal is transmitted at a constant position based on the acceleration detected by the acceleration sensor, and the position detecting signal is transmitted at a constant power, and the receiver includes
- a reception section, which is configured to receive the signals, and
- a reception-side control section, which is configured to execute a first identifying process and a second identifying process, wherein, in the first identifying process, the positions of the wheel assemblies, in which the corresponding transmitters are provided, are identified based on variations of the rotational positions of the wheel assemblies at the time when the constant position signals are received, and in the second identifying process, the positions of the wheel assemblies, in which the corresponding transmitters are provided, are identified based on received signal strength indications (RSSIs) of the position detecting signals.

2. The wheel assembly position identifying apparatus according to claim 1, wherein
each transmission-side control section is configured to
- cause the constant position signal to be transmitted when the acceleration detected by the acceleration sensor is less than or equal to a transmission threshold, and
- cause the position detecting signal to be transmitted when the acceleration detected by the acceleration sensor is greater than the transmission threshold, and each reception-side control section is configured to
- execute the first identifying process when the reception section receives the constant position signal but does not receive the position detecting signal, and
- execute the second identifying process when the reception section receives the position detecting signal.

3. The wheel assembly position identifying apparatus according to claim 2, wherein transmission time of each position detecting signal varies in accordance with the acceleration detected by the corresponding acceleration sensor.

4. The wheel assembly position identifying apparatus according to claim 1, wherein each transmission-side control section is configured to cause the position detecting signal to be transmitted when time during which the constant position signal cannot be transmitted at the constant position has continued for a predetermined period of time.

* * * * *